(No Model.)
D. E. SHAW.
CHAIN PUMP.
No. 256,167. Patented Apr. 11, 1882.
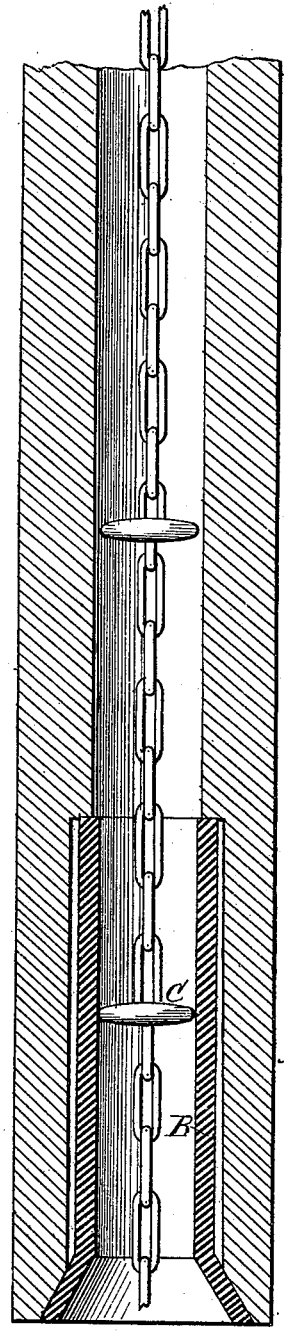
Witnesses:
W. C. McArthur
W. Reall
Inventor:
David E. Shaw,
per Chas. H. Fowler
Attorney.

UNITED STATES PATENT OFFICE.

DAVID E. SHAW, OF CHATSWORTH, ILLINOIS.

CHAIN-PUMP.

SPECIFICATION forming part of Letters Patent No. 256,167, dated April 11, 1882.

Application filed May 14, 1881. (No model.)

*To all whom it may concern:*

Be it known that I, DAVID E. SHAW, a citizen of the United States, residing at Chatsworth, in the county of Livingston and State of Illinois, have invented certain new and useful Improvements in Chain-Pumps; and I do hereby declare that the following is a full, clear, and exact description of the same, reference being had to the annexed drawing, making a part of this specification, and to the letters and figures of reference marked thereon.

The present invention has relation to certain new and useful improvements in tubing for chain-pumps. Experience has proven that the metal buckets or buttons used for raising the water in the pump-tube would soon wear away the wood, making the bore of the tubing much larger, and thus impairing the efficiency of the pump. This objection to the metal bucket was sought to be overcome by the employment of a rubber bucket fitting tightly the bore of the pump-tube. There being a considerable amount of friction produced between the pump-tube and bucket, this elastic material did not wholly remove the difficulty. Its being brought in contact with the wet soft wood wore it away almost as fast as the metal buckets.

A rubber tube has also been employed to take the place of the ordinary wooden pump-tube, the rubber tube being inclosed in a square box, so that said tube would be surrounded by water, whereby the pressure on the outside would cause the tube to hug the bucket.

The object of my invention is to improve the construction of the last-mentioned class of chain-pumps; and it consists in providing the ordinary wooden pump-tube, with its cylindrical bore, with a lining of rubber or other elastic or flexible material, and a closed or water-tight space between the lining and pump-tube to allow said lining to more perfectly adjust itself to the unevenness of the buckets than were the space constantly filled with a current of water, as heretofore. This object I attain by the construction substantially as shown in the drawing and hereinafter described.

In the accompanying drawing, which represents a sectional elevation of my invention, A is the pump-tube, of wood, similar to the tubes now in ordinary use. The lower portion of the pump-tube A has connected to it, around its bore, a lining, B, of rubber or other elastic material, the internal diameter of said lining being the same as that of the metal buckets C.

The bore of the pump-tube A, above the elastic lining B, is of slightly increased diameter, so that the edge of the buckets will not come in contact and wear the bore, as in the ordinary chain-pumps.

The opening or bore of the pump-tube surrounded by the lining B being of the same diameter as the bucket C, the close and perfect fitting thereof enables the water to be drawn up by suction until the bucket passes the end of lining B, when the water is lifted the rest of the way to the place of discharge, thereby forming both a suction and lift pump.

The metal buckets C, coming in contact with the elastic lining B, will not wear each other, but will remain the same and endure as long as the other parts of the pump, give better satisfaction, and without increasing the cost of manufacture.

The elastic lining B should be slightly longer than the distance between the buckets C, and at its lower end it should be flaring to admit the buckets easily.

The bore of the pump-tube A, at its lower end, is somewhat larger in diameter than the external diameter of the elastic lining, thereby leaving a closed or water-tight space between it and the wooden pump-tube, so that there may be room for the lining to change its shape from a true cylindrical form, for the reason that some of the metal buttons or buckets are not perfectly round, but are apt to be considerably out of a true circle. Therefore it will be seen that it is important to make provision for allowing the lining to adjust itself to the unevenness of the buttons or buckets, so as to insure their easy and perfect working. This lining B, if desired, may be a simple rubber tube inserted in the bore of the pump-tube and fastened thereto at the lower end.

In the metal or rubber bucket chain-pumps of ordinary construction the friction increases as the pump goes down, or as the well deepens. Therefore the usefulness and advantages of my invention will be apparent, as it will work with equal effect in deep and in shallow wells.

I do not desire to be understsod as confining myself to the extent in which the tube or lining extends up into the bore of the pump-tube, or to any special material from which the tube or lining is composed.

It is sufficient if it has in its nature the required degree of elasticity or flexibility to accomplish the object sought.

Having now fully described my invention, what I claim as new, and desire to secure by Letters Patent, is—

A chain-pump tube having the usual cylindrical bore, provided with a lining of rubber or other elastic or flexible material, and a closed or water-tight space interposed between the lining and pump-tube to allow said lining to adjust itself to the unevenness of the buckets, substantially as and for the purpose specified.

In testimony that I claim the above I have hereunto subscribed my name in the presence of two witnesses.

DAVID E. SHAW.

Witnesses:
H. M. BANGS,
O. C. LEVERING.